US006305712B1

(12) United States Patent
Hayashi

(10) Patent No.: US 6,305,712 B1
(45) Date of Patent: Oct. 23, 2001

(54) APPARATUS FOR SUPPORTING STEERING COLUMN OF VEHICLE AND PROCESS OF MAKING

(75) Inventor: Shogo Hayashi, Aichi (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/587,059

(22) Filed: Jun. 2, 2000

(30) Foreign Application Priority Data

Jun. 4, 1999 (JP) .................................................. 11-157378

(51) Int. Cl.[7] ...................................................... B62D 1/99
(52) U.S. Cl. ............................................ 280/777; 280/775
(58) Field of Search .................................... 280/775, 777, 280/779; 248/200, 224.8, 225.11

(56) References Cited

U.S. PATENT DOCUMENTS

| | | | |
|---|---|---|---|
| 4,989,898 | * 2/1991 | Yamaguchi et al. | 280/777 |
| 5,052,716 | * 10/1991 | Matsumoto | 280/777 |
| 5,425,553 | * 6/1995 | Yazane et al. | 282/777 |
| 5,520,416 | * 5/1996 | Singer, III et al. | 280/775 |
| 5,547,221 | * 8/1996 | Tomaru et al. | 280/777 |
| 5,615,916 | * 4/1997 | Fujiu et al. | 280/777 |
| 5,706,704 | * 1/1998 | Riefe et al. | 74/493 |
| 5,738,377 | * 4/1998 | Sugiki et al. | 280/777 |

FOREIGN PATENT DOCUMENTS

| | | |
|---|---|---|
| 61-183259 | 11/1986 | (JP) . |
| 6-227405 | 8/1994 | (JP) . |
| 6-227406 | 8/1994 | (JP) . |
| 7-186974 | 7/1995 | (JP) . |
| 8-053071 | 2/1996 | (JP) . |

* cited by examiner

*Primary Examiner*—Eric Culbreth
*Assistant Examiner*—L. Lum
(74) *Attorney, Agent, or Firm*—Foley & Lardner

(57) ABSTRACT

A sliding plate of a supporting apparatus normally clamps a supporting bracket for supporting a steering column and allows the supporting bracket to be detached from the sliding plate in case of a secondary collision of a vehicle. The sliding plate of the supporting apparatus has a center portion formed with a fastener hole for receiving a fastener to fasten the sliding plate to a vehicle body, a first lateral portion having a pressing bulge for resiliently abutting on the steering column supporting bracket, a first slit separating the center portion from the pressing bulge of the first lateral portion, and first and second through openings formed between the center portion and the first lateral portion. The first slit extends from the first through opening to the second through opening.

20 Claims, 5 Drawing Sheets

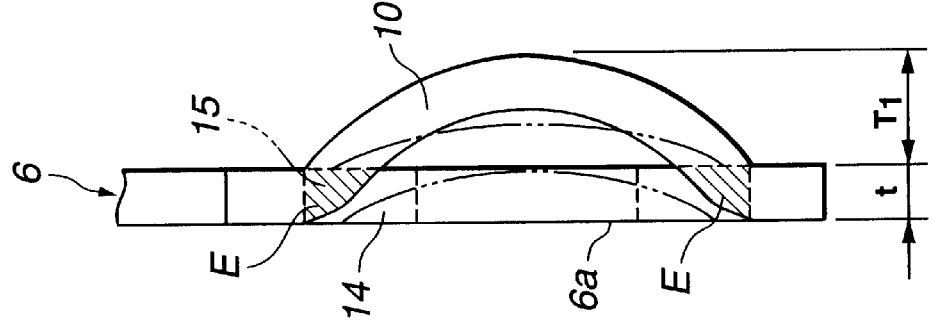
FIG.8A  FIG.8B
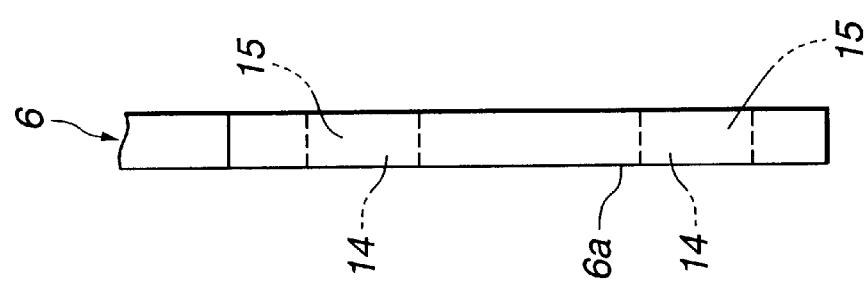
FIG.8C  FIG.8D
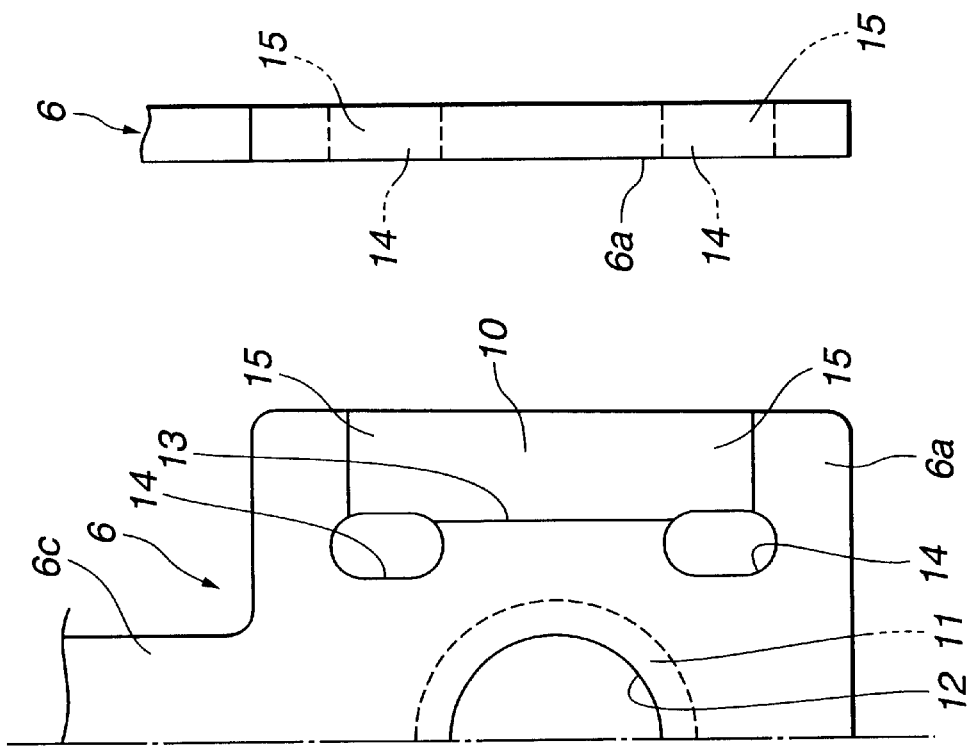

APPARATUS FOR SUPPORTING STEERING COLUMN OF VEHICLE AND PROCESS OF MAKING

BACKGROUND OF THE INVENTION

1. Field of the Invention

The present invention relates in general to a supporting apparatus for supporting a steering column of a vehicle. More specifically, the present invention relates to a sliding plate for detachably supporting a supporting bracket (upper bracket) of the steering column on a vehicle body, and a process for producing the sliding plate.

2. Description of the Related Art

A steering column is an assembly of a steering shaft for transmitting rotation of a steering wheel to a steering gear box, and a column tube enclosing the steering shaft. A steering column of one type is so arranged that the entire steering column is detached, in case of a collision of a vehicle, from a vehicle body and moved toward footings of a seat occupant for protecting the seat occupant from being injured.

Japanese Utility Model First Publication No. 61(1986)-183259 discloses a supporting bracket having a pair of wings. The supporting bracket is fastened to a column tube of a steering column. Each of the wings has a U-shaped cutout formed on an edge facing toward a driver. The edge of each wing is inserted into a sliding plate having a U-shaped cross section. Each sliding plate clamps a corresponding one of the wings of the supporting bracket. Each sliding plate has a bolt hole corresponding to the cutout of the corresponding wing. On each of right and left sides of the bolt hole, there is formed a pressing region which resiliently abuts on the supporting bracket. With a bolt passing through the bolt hole, each sliding plate is fastened to the vehicle body, and thereby the steering column is detachably supported to the body via the supporting bracket.

The pressing regions of each sliding plate are designed to have the property of elastic deformation to normally suppress looseness of the supporting bracket, and to allow the supporting bracket to be detached easily from the sliding plate in case of a collision of the vehicle. Therefore, the pressing regions are required to abut on the supporting bracket firmly for suppressing looseness of the supporting bracket, and lightly for detaching the supporting bracket from the sliding plate. To achieve this, there is a demand for producing sliding plates uniformly so as to reduce nonuniformity in load of pressing regions for resilient abutment.

However, the sliding plate has a predetermined thickness for securely supporting the steering column. Moreover, since the pressing regions of the sliding plate are formed with a press, the pressing regions of the sliding plate are not severed but connected at end regions in such a manner to prevent elastic deformation Therefore, the abutting load of the pressing regions of the sliding plate is unstable due to unit to unit nonuniformity, and hence the sliding plate tends to cause looseness of the steering column and to increase the load for extraction of the supporting bracket. This makes it difficult to design a pressing region having a desired characteristic.

SUMMARY OF THE INVENTION

It is therefore an object of the present invention to provide structure and production process for a supporting apparatus having a sliding plate with a wide elastically deformable pressing region.

According to the present invention, a supporting apparatus for supporting a steering column of a vehicle comprises a sliding plate for clamping a supporting bracket for supporting the steering column. The sliding plate comprises: a portion having a pressing bulge for resiliently abutting on the steering column supporting bracket; a slit separating the pressing bulge from an adjacent region; and first and second through openings. The slit extends from the first through opening to the second through opening.

BRIEF DESCRIPTION OF THE DRAWINGS

FIG. 8A is a half plan view of the sliding plate;

FIG. 8B is a side view of the sliding plate;

FIG. 8C is a first sub-step of pressing the sliding plate in a first direction; and FIG. 8D is a second sub-step of pressing the sliding plate in a second direction opposite to the first direction.

DETAILED DESCRIPTION OF THE EMBODIMENT

As is seen in FIGS. 1 through 7, there is provided a supporting apparatus for supporting a steering column 1 of a vehicle, according to a preferred embodiment of the present invention.

Figure 1:
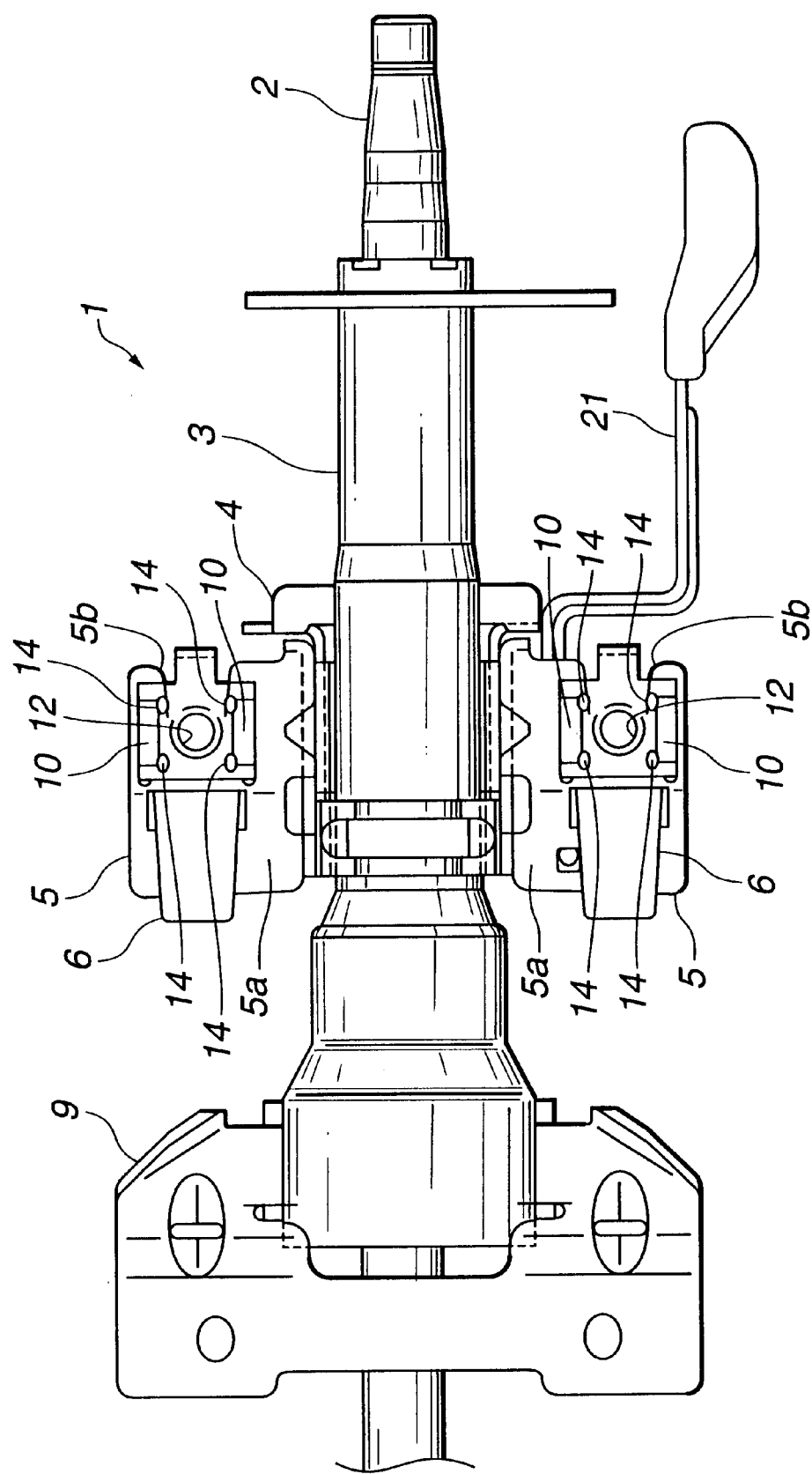
FIG. 1 is a plan view of a steering column, according to a preferred embodiment of the present invention.
Figure 2:
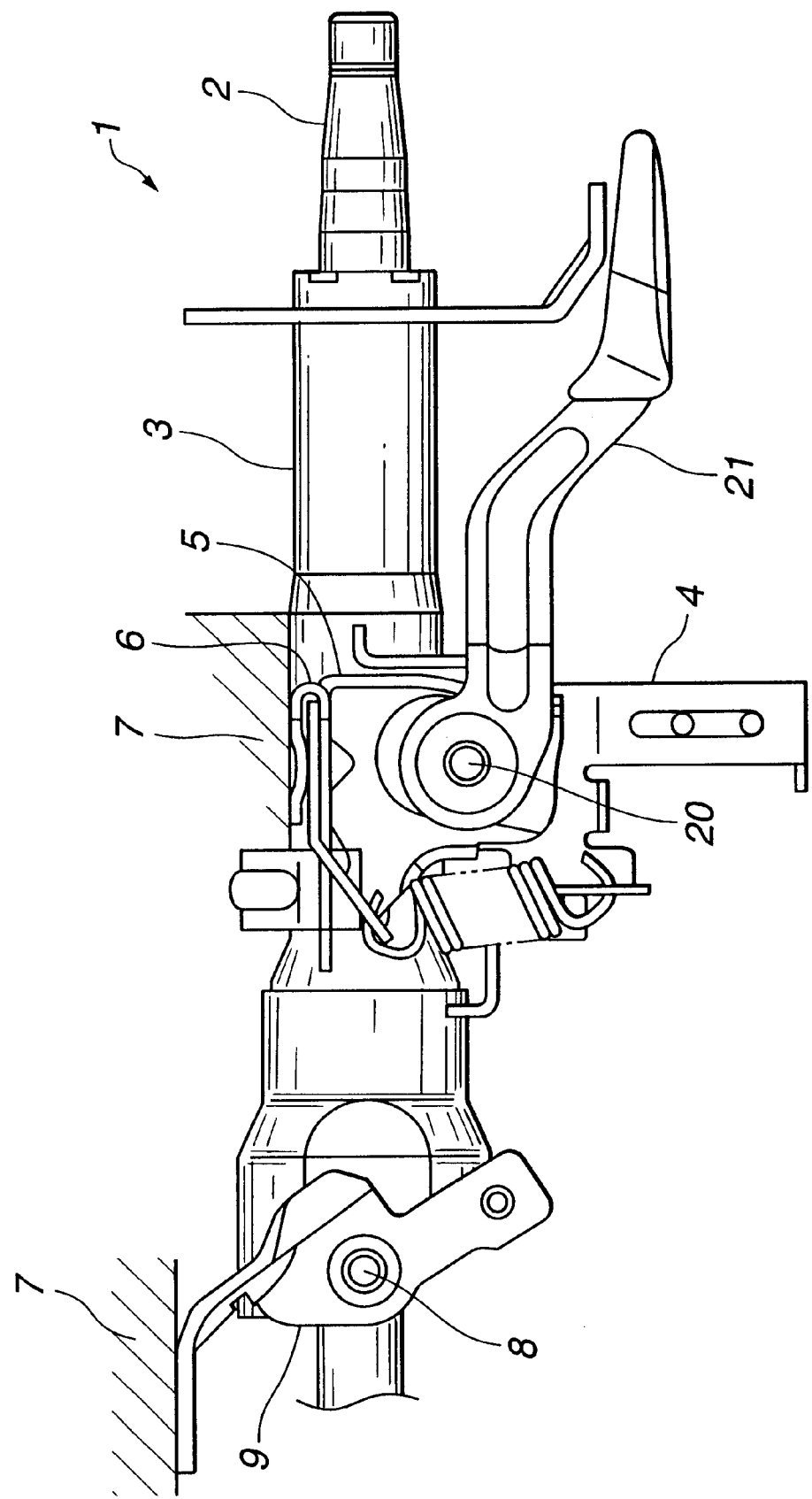
FIG. 2 is a side view of the steering column, according to the preferred embodiment of the present invention.
Figure 3:
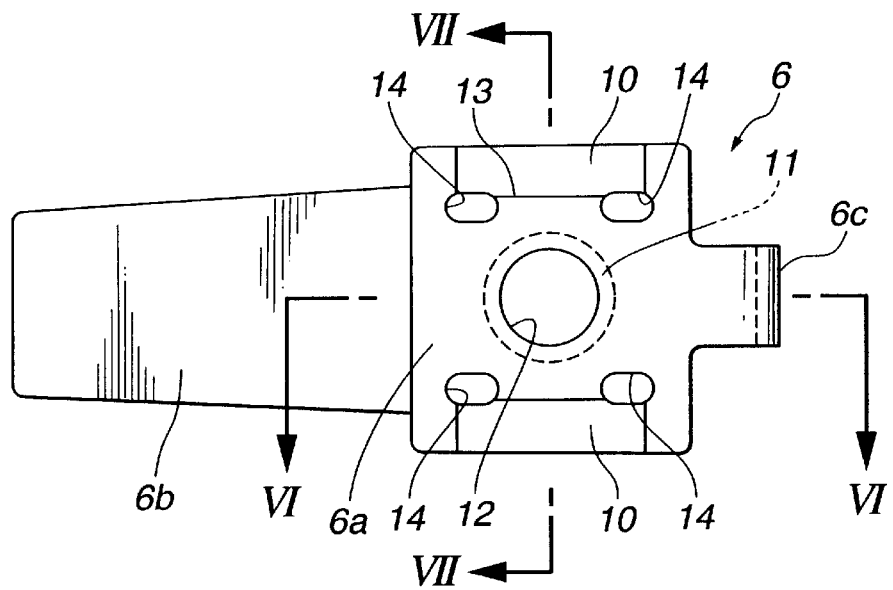
FIG. 3 is a plan view of a sliding plate of the steering column.
Figure 4:
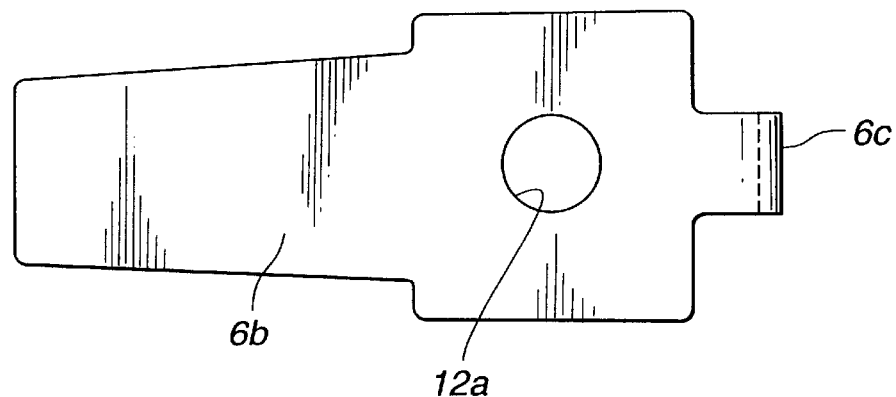
FIG. 4 is a rear view of the sliding plate.
Figure 5:
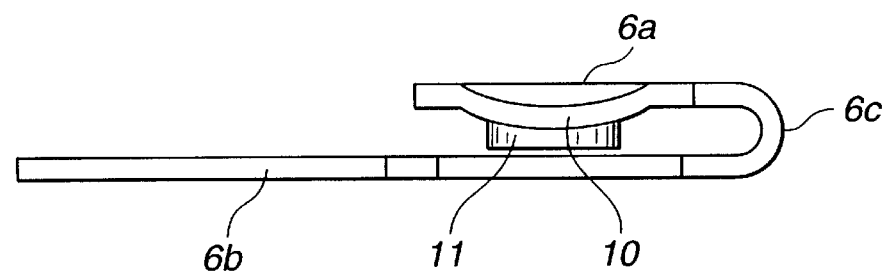
FIG. 5 is a side view of the sliding plate.
Figure 6:
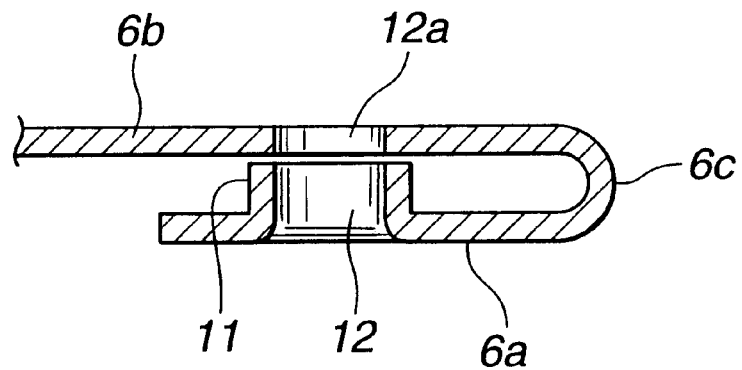
FIG. 6 is a cross section of the sliding plate taken along lines VI—VI in FIG. 3.
Figure 7:
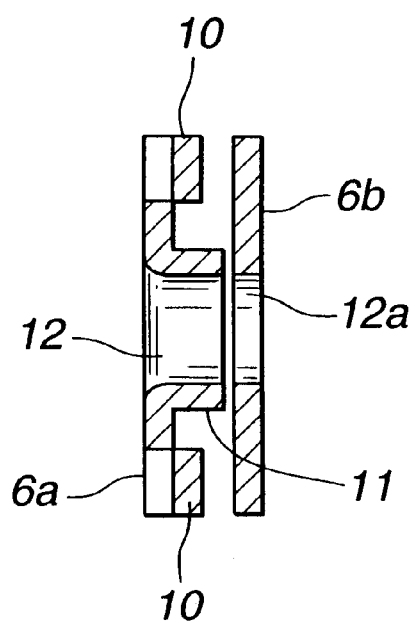
FIG. 7 is a cross section of the sliding plate taken along lines VII—VII in FIG. 3.

FIGS. 1 and 2 are, respectively, a plan view and a side view of the steering column 1. The steering column 1 has a steering shaft 2 and a column tube 3 enclosing the steering shaft 2. A distance bracket 4 is combined with the steering column 1 at the middle of the column tube 3. A supporting bracket 5 (upper bracket) tiltably supports the distance bracket 4 for tilt adjustment. The supporting bracket 5 is fixed to a vehicle body 7 via sliding plates 6. At a lower end of the column tube 3, the steering column 1 is pivotably supported to the vehicle body 7 with a lower bracket 9 via another shaft 8. There are provided a tilt bolt 20 passing through the distance bracket 4 and the supporting bracket 5, and a tilt lever 21 for tightening and releasing the tilt bolt 20. The supporting bracket 5 has a pair of elongate openings (not shown) for the tilt bolt 20 to pass through. For tiltably adjusting the distance bracket 4, the distance bracket 4 is moved upward or downward along the pair of elongate openings of the supporting bracket 5.

The supporting bracket 5 has left and right wing portions 5a, each of which is formed with a U-shaped cutout 5b, and fixed to the vehicle body 7 through the sliding plate 6.

The sliding plates 6 for each wing portion 5a is a plate having a U-shaped cross section formed by a sliding plate section 6b, an abutting plate section 6a and a bent plate section 6c.

The sliding plate 6 for each wing portion 5a has first and second lateral portions extending, respectively, on first and second sides of a center portion of an abutting plate section 6a of the sliding plate 6. Each of the first and second lateral portions of the abutting plate section 6a has a pressing region 10. The sliding plate 6 covers the U-shaped cutout 5b of the corresponding wing portion 5a of the supporting bracket 5 in a manner that the pressing regions 10 of the sliding plate 6 resiliently abut on the wing portion Sa of the supporting bracket 5. The cutout 5b of the wing portion Sa is recessed from an edge of the wing portion 5a in a direction away from a seat occupant. As is seen in FIGS. 3 through 7, the sliding plate 6 has the abutting plate section 6a covering the cutout 5b. The abutting plate section 6a is substantially rectangular in plan view. The center portion of the abutting plate section 6a is formed with a fastener hole 12 having a flange 11 projecting toward the sliding plate section 6b. The pressing region 10 on each side is bulged in a direction in which the flange 11 projects. The sliding plate section 6b of the sliding plate 6 confronts the abutting plate section 6a of the sliding plate 6. The sliding plate section 6b extends longer from the bent plate section 6c than the abutting plate section 6a. The bent plate section 6c is smaller in width measured along a lateral direction perpendicular to a longitudinal direction of the sliding plate 6, than each of the abutting plate section 6a and the sliding plate section 6b. The sliding plate section 6b has a fastener hole 12a aligned with the fastener hole 12 of the abutting plate section 6a to define a single fastener passage.

The abutting plate section 6a of the sliding plate 6 has first and second through openings 14 spaced from each other in the longitudinal direction along each of the first and second lateral portions of the abutting plate section 6a. A slit 13 extends from the first through opening 14 to the second through opening 14 along each of the first and second lateral portions of the abutting plate section 6a. The pressing region 10 of the abutting plate section 6a on each side projects toward the sliding plate section 6b, and bulges in the form of an arch. The pressing region 10 has first and second base subregions 15 adjacent, respectively, to the first and second through openings 14, and a middle subregion projecting toward the sliding plate section 6b between the first and second base subregions 15. The middle subregion of the pressing region 10 is located between the first and second subregions along the longitudinal direction of the sliding plate 6. Along the slit 13 on each side, the pressing region 10 is fully separated from the center portion up to the first and second base subregions 15.

FIGS. 8A through 8D show a process for producing the sliding plate 6 of the supporting apparatus.

As is seen in FIG. 8A and FIG. 8B, the sliding plate 6 has the first and second through openings 14 between the center portion and the lateral portion of the abutting plate portion 6a of the sliding plate 6.

FIG. 8C shows a first sub-step of pressing a predetermined region 10 (pressing region 10) of each lateral portion of the abutting plate section 6a to a first depth T1 in a first direction until the pressing region 10 is severed from the center portion along the slit 13 extending from the first through opening 14 to the second through opening 14. The center portion of the sliding plate 6 has a first (right) surface facing in the first direction (that is, the rightward direction as viewed in FIG. 8C). A pressing force is applied to the predetermined region 10 of the lateral portion of the abutting plate section 6a in the first (rightward) direction until concave and convex surfaces formed in the predetermined region 10 are both swelled beyond the first (right) surface of the center portion. The first depth T1 is substantially two times as deep (thick) as the thickness t of the sliding plate 6, so that even a region 16 which is unlikely to be severed can be severed completely.

FIG. 8D shows a second sub-step of pressing the predetermined region 10 of each lateral portion of the abutting plate section 6a in a second direction opposite to the first direction until a depth of the predetermined region 10 is decreased to a second depth T2 smaller than the first depth T1. The second depth T2 is substantially equal to the thickness t of the sliding plate 6.

Thereafter, the sliding plate 6 is bent into the U-shape so as to align the bolt holes 12 and 12a with each other. The bolt holes 12 and 12a are formed in advance before the first sub-step.

Through the pressing step shown in FIG. 8C, the predetermined region 10 of the abutting plate section 6a of the sliding plate 6 is completely severed from the center portion along the slit 13. Moreover, this process facilitates the formation of the pressing region 10. Since the pressing region 10 can be formed through pressing, it is possible to form the pressing region 10 simultaneously with the flange 11.

The pressing region separated along the slit can be deformed elastically over a wide area. Therefore, this sliding plate can decrease variation in the abutting load of the pressing region, decrease the nonuniformity, and stabilize the extraction load of the bracket.

Thus, the supporting apparatus can hold the steering column firmly without looseness, and improve the performance in case of a collision.

What is claimed is:

1. A supporting apparatus of a steering column of a vehicle, comprising:
   1) a supporting bracket for supporting the steering column to a vehicle body of the vehicle; and
   2) a sliding plate for clamping the supporting bracket, the sliding plate being adapted to be fixed to the vehicle body, the sliding plate comprising:
      a) first and second through openings arranged along a first side of the sliding plate;
      b) a slit extending from the first through opening to the second through opening; and
      c) a pressing region defined between the slit and the first side of the sliding plate, the pressing region projecting toward the supporting bracket and resiliently abutting on the supporting bracket.

2. A supporting apparatus as claimed in claim 1, wherein the pressing region of the sliding plate is curved in a form of an arch, and the pressing region comprises a convex surface for pressing the supporting bracket in a manner to allow the supporting bracket to be detached from the vehicle body in case of a secondary collision.

3. A supporting apparatus as claimed in claim 1, wherein the sliding plate is a U-shaped plate comprising:
   a) an abutting plate section extending in a longitudinal direction of the sliding plate from a first longitudinal end of the sliding plate toward a second longitudinal end of the sliding plate, the first and second through openings, the pressing region and the slit being formed in the abutting plate section;
   b) a sliding plate section extending from the first longitudinal end of the sliding plate to the second longitudinal end of the sliding plate along the abutting plate section; and
   c) a bent plate section connecting the abutting plate section and the sliding plate section at the first longitudinal end; and
   wherein the supporting bracket comprises a plate portion resiliently clamped between the abutting plate section and the sliding plate section of the sliding plate.

4. A supporting apparatus as claimed in claim 3, wherein the abutting plate section is shorter than the sliding plate section, the sliding plate section extends from the bent plate section up to the second longitudinal end of the sliding plate whereas the abutting plate section extends from the bent plate section toward the second longitudinal end and terminates at an intermediate position between the first and second longitudinal ends of the sliding plate; and wherein the plate portion of the supporting bracket comprises a cutout located between the abutting plate section and the sliding plate section of the sliding plate, and recessed from an edge of the plate portion in a direction away from the bent plate section of the sliding plate.

5. A supporting apparatus as claimed in claim 4, wherein the abutting plate section of the sliding plate comprises a first fastener hole and the sliding plate section comprises a second fastener hole which is aligned with the first fastener hole in a manner to receive a fastener extending through the cutout of the plate portion of the supporting bracket.

6. A supporting apparatus as claimed in claim 5, wherein the abutting plate section of the sliding plate further comprises a flange defining the first fastener hole and projecting toward the sliding plate section.

7. A supporting apparatus as claimed in claim 6, wherein the first and second through openings are spaced from each other in the longitudinal direction of the sliding plate, and the slit extends in the longitudinal direction of the sliding plate.

8. A supporting apparatus as claimed in claim 7, wherein the pressing region comprises first and second base subregions adjacent, respectively, to the first and second through openings, and a middle subregion projecting toward the sliding plate section between the first and second base subregions, and the middle subregion is located between the first and second subregions in the longitudinal direction of the sliding plate.

9. A supporting apparatus as claimed in claim 3, wherein the pressing region of the abutting plate section of the sliding plate is severed along the slit between the first and second through openings from a center portion of the abutting plate section.

10. A supporting apparatus as claimed in claim 1, wherein an abutting plate section of the sliding plate comprises first and second lateral portions each of which is formed with the first and second through openings and the slit, and a center portion formed with a fastener hole and located between the first and second lateral portions.

11. A process for producing a supporting apparatus of a steering column of a vehicle, the process comprising the following steps of:

1) forming first and second through openings along a first side of a sliding plate; and 2) pressing the sliding plate in a predetermined region between a line connecting the first and second through openings and the first side of the sliding plate until a slit is formed along the line and the predetermined region is bulged.

12. A process as claimed in claim 11, wherein the pressing step comprises a first sub-step of pressing the predetermined region of the sliding plate in a first direction until the slit is formed, and a second sub-step of pressing the predetermined region of the sliding plate in a second direction opposite to the first direction; and wherein the process further comprises a bending step of bending the sliding plate into a shape of a letter U after the pressing step.

13. A supporting apparatus for supporting a steering column of a vehicle, the supporting apparatus comprising:

a U-shaped bent plate section;

a sliding plate section extending from one end of the bent plate section to a projecting end, and comprising a fastener hole; and an abutting plate section extending from the other end of the bent plate section to a projecting end along the sliding plate section, and confronting the sliding plate section to resiliently clamp a supporting bracket for supporting the steering column, the abutting plate section comprising;

a center portion formed with a fastener hole for defining a single fastener passage with the fastener hole of the sliding plate section;

first and second lateral portions extending, respectively, on first and second sides of the center portion, each of the first and second lateral portions comprising a pressing region bulging toward the sliding plate section;

a first slit separating the center portion from the pressing region of the first lateral portion;

a second slit separating the center portion from the pressing region of the second lateral portion;

first and second through openings formed between the center portion and the first lateral portion, the first slit extending from the first through opening to the second through opening; and third and fourth through openings formed between the center portion and the second lateral portion, the second slit extending from the third through opening to the fourth through opening.

14. A supporting apparatus as claimed in claim 13; wherein the sliding plate section, the abutting plate section and the bent plate section are integral parts of a U-shaped sliding plate, the bent plate section connects the sliding plate section and the abutting plate section so as to form a U-shaped cross section, the sliding plate section extends from the bent plate section in a predetermined longitudinal direction to the projecting end, the first and second slits extends in the longitudinal direction, the first and second through openings are spaced apart from each other in the longitudinal direction, and the third and fourth through openings are spaced apart from each other in the longitudinal direction; wherein the sliding plate section extends longer from the bent plate section than the abutting plate section, and the projecting end of the abutting plate section is located between the projecting end of the sliding plate section and the bent plate section in the longitudinal direction; and wherein the bent plate section is smaller in width measured in a lateral direction perpendicular to the longitudinal direction than at least one of the abutting plate section and the sliding plate section.

15. A supporting apparatus as claimed in claim 14, wherein each of the through openings is elongated in the longitudinal direction, and wherein each of the through openings is defined between an outer boundary and an inner boundary spaced apart from each other in the lateral direction, and the inner boundaries of the first, second, third and fourth through openings are located between the first and second slits and spaced apart from each of the first and second slits in the lateral direction.

16. A supporting apparatus as claimed in claim 14, wherein the supporting apparatus further comprises the supporting bracket for supporting the steering column, the supporting bracket comprises a first wing portion formed with a U-shaped cutout for receiving a fastener passing through the fastener holes of the sliding plate to fasten the supporting bracket through the sliding plate to a vehicle body, the U-shaped cutout opens in a direction toward an upper end of the steering column, the first wing portion is clamped between the sliding plate section and the abutting plate section, and the U-shaped cutout is covered by the sliding plate section, the abutting plate section and the bent plate section.

17. A supporting apparatus for supporting a steering column of a vehicle, the supporting apparatus comprising:

a sliding plate for normally clamping a supporting bracket for supporting a steering column and allowing the supporting bracket to be detached from the sliding plate in case of a secondary collision of the vehicle, the sliding plate comprising;

i) a center portion formed with a fastener hole for receiving a fastener to fasten the sliding plate to a vehicle body;

ii) a first lateral portion comprising a pressing bulge for resiliently abutting on the supporting bracket;

iii) a first slit separating the center portion from the pressing bulge of the first lateral portion; and iv) first and second through openings formed between the center portion and the first lateral portion, the first slit extending from the first through opening to the second through opening.

18. A process for producing a supporting apparatus for supporting a steering column of a vehicle, the process comprising the following steps of:

preparing a sliding plate comprising first and second through openings between a center portion and a lateral portion of the sliding plate, and pressing a predetermined region of the lateral portion to form a bulge in the predetermined region and a slit extending from the first through opening to the second through opening.

19. A process as claimed in claim 18, wherein the sliding plate prepared by the preparing step is a flat plate comprising the center portion which is formed with a fastener hole for receiving a fastener to fasten the sliding plate to a vehicle body, the pressing step comprises a first sub-step of pressing the predetermined region of the lateral portion to a first depth in a first direction until the lateral portion is severed from the center portion along the slit extending from the first through opening to the second through opening, and a second sub-step of pressing the predetermined region of the lateral portion in a second direction opposite to the first direction until a depth of the predetermined region is decreased to a second depth smaller than the first depth.

20. A process as claimed in claim 19, wherein the center portion of the sliding plate prepared by the preparing step comprises a first surface facing in the first direction, and a second surface facing in the second direction opposite to the first direction, and, in the first sub-step of the pressing step, a pressing force is applied to the predetermined region of the lateral portion of the sliding plate in the first direction until concave and convex surfaces formed in the predetermined region are both swelled beyond the first surface of the center portion.

* * * * *